June 26, 1945.  G. G. NAUD  2,379,029
ELECTROMAGNETIC ACTUATOR
Filed Oct. 4, 1941  2 Sheets-Sheet 1
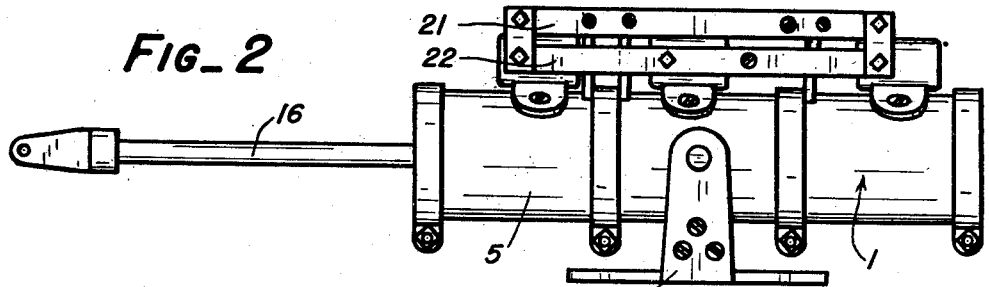
Fig_2
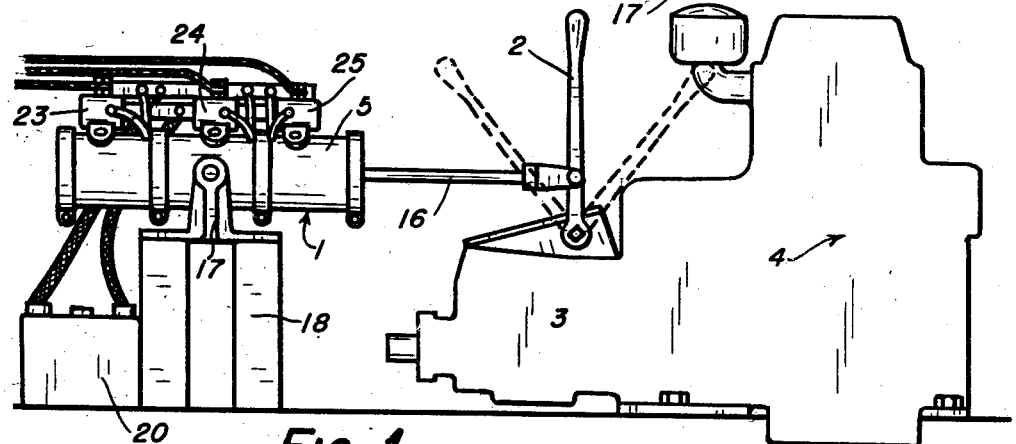
Fig_1
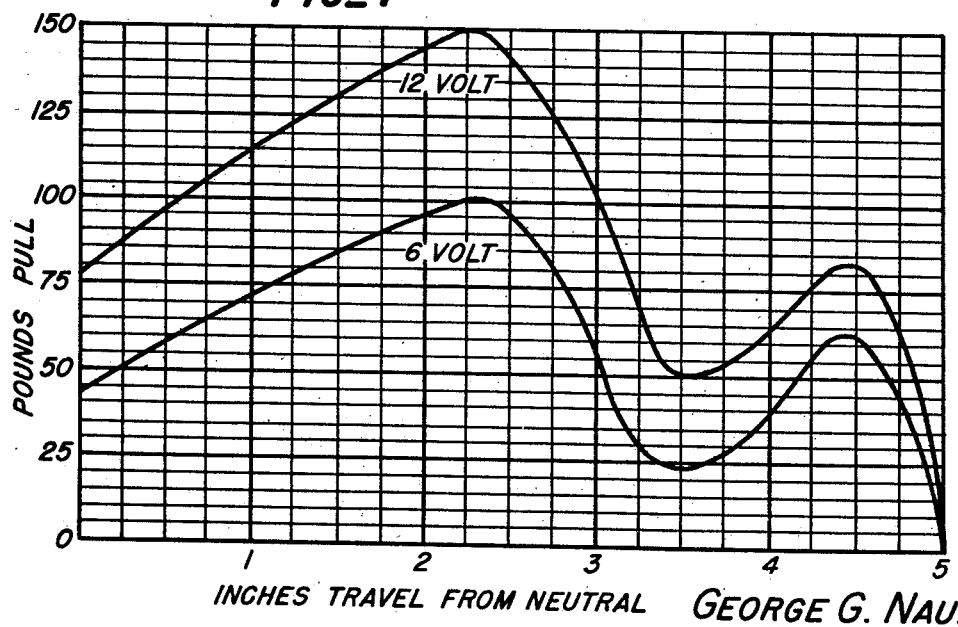
Fig_7
GEORGE G. NAUD
INVENTOR
BY [signature]
ATTORNEYS June 26, 1945.  G. G. NAUD  2,379,029
ELECTROMAGNETIC ACTUATOR
Filed Oct. 4, 1941  2 Sheets-Sheet 2
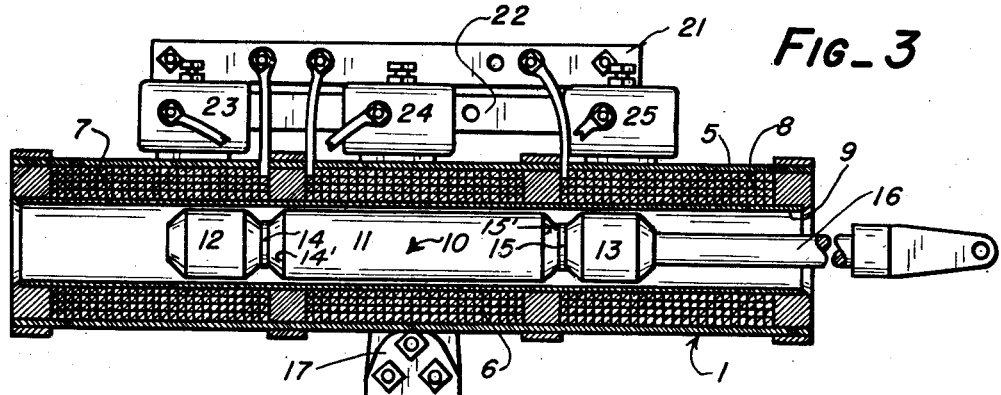
FIG_3
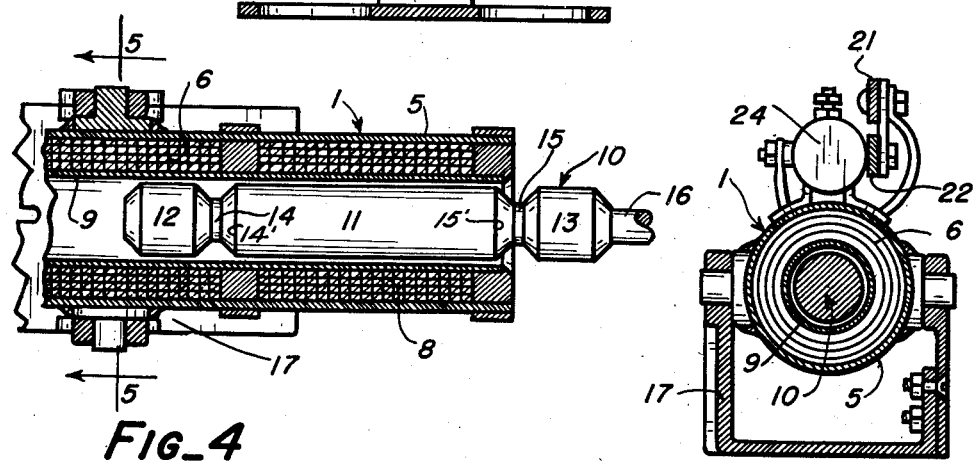 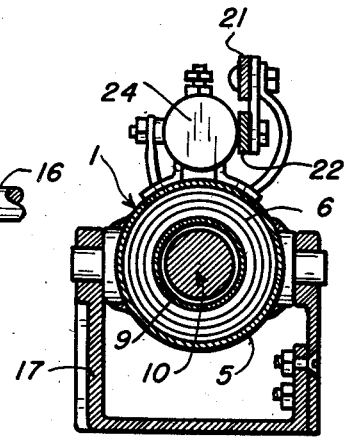
FIG_4  FIG_5
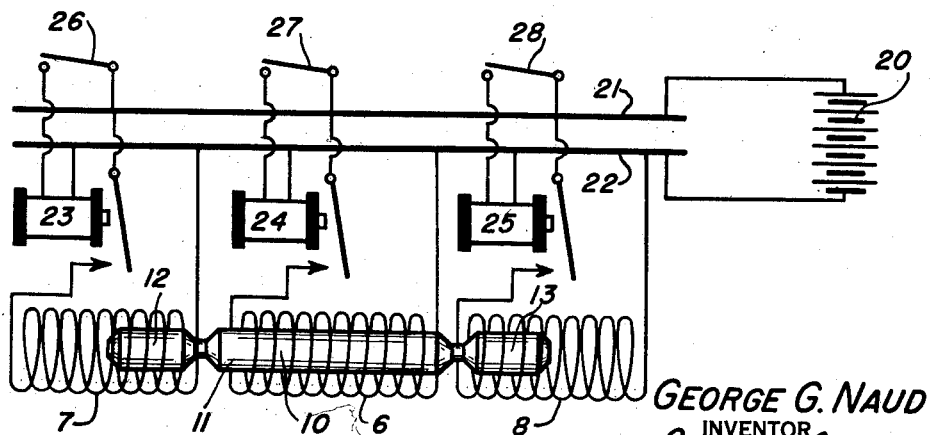
FIG_6
GEORGE G. NAUD
INVENTOR
BY *Swift & Fuck*
ATTORNEYS Patented June 26, 1945

2,379,029

UNITED STATES PATENT OFFICE 2,379,029

ELECTROMAGNETIC ACTUATOR

George G. Naud, Seattle, Wash., assignor to Webster-Brinkley Co., a corporation of Washington Application October 4, 1941, Serial No. 413,705

6 Claims. (Cl. 175—341)

My present invention relates to improvements in an electromagnetic actuator for shifting clutches, and in particular for shifting double clutches such as are in use in marine engines.

In the prior art, great difficulty has been had to obtain an electromagnetic actuator for clutches which would give smooth and positive engagement, and which would not grab and would, also, prevent slipping between the plates to an undue degree just as the driven and drive plates are about to reach synchronism. This slipping has required that engagement of the clutch plate be accomplished with the application of large amounts of force during the entire period of engagement. This means that after a shift is complete, forces remain on the clutch which cause wear on the shifting fork, and its bearing. This also means that the clutch will grab or operate too rapidly. If this grabbing is reduced, then the clutch commences to slip to too great an extent.

Having in mind these defects of the prior art, it is an object of the present invention to devise an electromagnetic actuator for shifting clutches which will apply the required force to commence engagement of the clutch plate, then rapidly reduce this pressure until the clutch is practically entirely engaged and then at the last moment of engagement increase the pressure to obtain positive engagement to prevent slipping.

A further object of the present invention is the construction of an electromagnetic actuator which has in it, due to its electrical construction, characteristics which will give a force travel curve for the core such that the curve will have a point of inflection.

It is another object of the present invention to design an electromagnetic actuator such that it will have inherent in it, due to its electrical characteristics, an output such that the force travel curve of the core will first decrease from a maximum, will then have a second maximum less than the first, and then decrease further.

Another object of the present invention is the provision in an electromagnetic actuator of a solenoid having a movable magnetic core in which the reluctivity of said core varies so that the force travel curve of said core will have an inflection point.

Another object of the present invention is the provision in an electromagnetic actuator having a solenoid, of a movable magnetic core which has a variable cross-sectional area so that the force travel curve of said core will have inflection points therein.

A further object of the present invention is the provision of an electromagnetic actuator for a double clutch having three solenoids mounted so that they have a common axis and providing for said solenoid a common movable magnetic core which is reduced in cross-sectional area adjacent each end of the core so that the force travel curve for said core will have points of inflection resulting in a decreased force applied to said clutches as each one of them is operated by said device and an increase in pressure just at the time completion of engagement is effected to prevent slipping.

A still further object of the present invention is the provision of an electromagnetic actuator which will actuate a clutch so that it does not grab nor does it slip.

Another and further object of the present invention is the provision of a magnetic actuator for actuating a clutch, which will decrease the force applied for shifting as the driving and driven ends of the clutch come into synchronism, and which actuator will just prior to the point of synchronism, increase the pressure applied for shifting to prevent slipping.

One other object of the present invention is the provision of an electromagnetic device for shifting a double clutch and of providing a neutral point for such shifting, and in which the shifting will be such that there is neither grabbing nor slipping as synchronism is about to be had. This characteristic is to be had by so designing the core of a solenoid that its reluctance will vary along its length.

These defects of the prior art and these objects and others are attained by mounting three solenoids on a common axis and providing them with a common core. The core is connected by a link to the shifting lever of a double clutch. The center solenoid is used to return the clutch to its neutral position. The end solenoids are used to obtain movement of the core to one limit or the other and thus to obtain engagement of the clutches.

The desired mode of action is obtained by reducing the cross-sectional area of the solenoid core at a point adjacent to each end of the core. This reduction in cross-sectional area changes the reluctivity of the core so that the force travel curve of the core will have a point or points of inflection and even a second maximum. The placing of this reduction close to the end of the core means that this point of inflection will occur near the limit of travel of the core. The degree of cross-sectional reduction will determine the degree of inflection—that is, if the reduction is of sufficient magnitude there will then occur in the force travel curve a second maximum value less than the first maximum value. The distance of this second maximum value from the end of the travel of the core may be so governed that this added or increased pressure will occur just as the driven and drive ends of the clutch reach synchronism.

A device constructed in accordance with the above, and which will remedy the above mentioned defects of the prior art and obtain the above mentioned objects is hereinafter described in detail and shown in the accompanying drawings, wherein:

Figure 1 is an elevational view of an assembly showing an electromagnetic actuator coupled to the shifting lever of an ordinary marine engine.

Figure 2 is a back elevational view of the magnetic actuator shown in Figure 1.

Figure 3 is an elevational view in section of the electromagnetic actuator shown in Figures 1 and 2.

Figure 4 is a partial sectional view similar to Figure 3 but showing the core at one end of its limit of travel.

Figure 5 is a section on the line 5—5 of Figure 4.

Figure 6 is a schematic wiring diagram for the device.

Figure 7 is a graph showing the operating characteristics of the actuator.

In Figure 1 is shown an electromagnetic actuator 1 linked to the clutch shifting lever 2 of the conventional double clutch transmission 3 of a marine engine 4. The electromagnetic actuator is composed of a cylindrical housing 5 which contains three solenoids, a center solenoid 6 and two end solenoids 7 and 8. The three solenoids are wound on a common tube 9. These three coaxial solenoids are of an identical nature, and provided at opposite ends of each is a high-permeance polar ring, as cold-rolled steel. Peculiarized by their very appreciable width, and having the two inner rings acting as a polar member both for the center coil and a related end coil, these said rings are in contiguity with a sleeve encasing the several coils and which, similarly, is of a high-permeance character. Placed in the tube 9 is the core 10 which is common to the three solenoids. This core, being the armature for the assembly, provides a close-fitting center part 11 which is steeply cut away at the ends to describe abrupt shoulders of sharp definition at their originating point of juncture with the perimeter of the center part, and extending from inner limits of the two shoulders as integrate axial prolongations of the center part are reduced necks 14 and 15, respectively. The spacing as between said originating shoulder-junctures is in exact correspondence with the spacing which obtains between the median line of one and the median line of the other of the two polar rings associated with each coil, and the import of this relation will be made clear in the course of the following explicit reference to the action of the armature.

In the form in which said axial prolongations are shown, the same are terminally knobbed to describe head extremities 12 and 13 of a diameter corresponding to the center part and thus closely fitting the coils, and these said knob-heads are disposed in such distant relation to the end limits of the center part as to present air gaps of pronounced width therebetween. It should be here stated that the degree of prolongation and the shaping of the end projections essentially governs the pull curve of the armature as the latter is caused to move from a centered position within one to a centered position within an adjacent coil, and I therefore stress that the illustrated core is portrayed simply by way of example and that departures therefrom are perforce resorted to and determined by the exigencies of any given work requirement. This will be best understood by tracing the action of the armature core indicated as the same is caused to be excited. Assuming that the armature core occupies the position in which I have shown the same in Fig. 3, and that solenoid 8 is energized, it will be apparent that the knob-head 13 is subjected to an immediate strong attraction in that the same projects into the field of fairly uniform flux, or which is to say extends well beyond the end zones whereat the flux drops off. Reflecting itself in a comparatively strong initiating axial thrust, the attraction progressively builds up as the knob-head advances and the following center part approaches the zone of maximum field density, augmented by the induced flux transmitted thru the connecting neck from the knob-head 13 to the integrate center part. A peak in the rapidly rising pull curve is reached as the knob-head and center part collectively derive a flux of maximum saturation value through the respective leading shoulder-juncture. The moment during which both the exciting force and the induced flux are constant is of short duration—distinguished from the customary armature devoid of a wide air gap functionally separating an advance knob from a following principal—and with the drop in the exciting flux as the knob-head works beyond the field of maximum density there is created a conflict dominated by the center part and attributed to the reluctance of the knob-head—using the term in its general sense of a struggle—to vary the constancy which had theretofore existed between the exciting force and the induced flux. Following the ensuing decline in the force curve, there then develops a modified recurrence of rising pull as the knob-head 13 traverses the related polar ring, and which continues until the head carries therebeyond and whereupon the customary centering decline takes place as the field due to the coil and that due to the armature core tend to parallelism. The fact of providing high-permeance polar rings with their ready assimilation of force lines, taken in connection with the exactitude which obtains between the spacing of the ring medians and the spacing of the shoulder-junctures 14'—15' now becomes of especial import as I find that this arrangement functions to accomplish the highly desired end of exactly and instantaneously centering the armature core with substantially a total elimination of any noticeable tendency to vacillate or tremble. The said rings act as a trap largely precluding stray force lines and with the encasing sleeve produce a low-reluctance return circuit for the flux developing an intense stabilizing influence concentrated one ring upon one shoulder-juncture and the other ring upon the other shoulder-juncture. This feature of an assured exact centering of a free-running as distinguished from a stop-limited plunger is, in the art of plunger-and-solenoid electromagnets, probably of even greater import than the adaptability of the assembly, by varying the shapes of the end prolongations, to the accomplishment of given force curves, the highly objectionable fluctuation of previous plunger-and-solenoid electromagnets as the same reach their travelling extreme, and which I have found can be positively overcome by applying relatively wide rings of low reluctivity in the manner described, being perhaps largely responsible for the disfavor with which free-running plungers have been heretofore looked upon.

In my illustrated application of the device as an actuator for shifting the transmission gearing of a marine engine, I have shown the solenoid housing as being pivotally carried by trunnions which are wrist mounted on a bracket 17 secured to a pedestal 18. One end of the core is connected to the shift lever 2 by means of a link 16.

Referring to Figure 6, power is delivered from a battery 20 to the solenoids through two bus bars 21, 22. Each solenoid has one side permanently connected to a bus as 22. The other side of each solenoid is connected through a relay 23, 24, 25, to the other bus, 21. The relays are operated through switches 26, 27, 28. The switches may be located in any convenient place such as adjacent to the wheel of the ship, on the bridge, or in a fishing pulpit. They may be even placed on the end of a cable and taken about the deck of the ship. The core 10 should be of soft iron so that it will not have residual magnetism. If there is some residual magnetism it may be well to connect the end solenoids so that their magnetic fields are in opposition.

The operation of the device as hereinbefore described may be supplemented by reference to Fig. 7 of the drawings wherein two force curves for the illustrated armature core have been plotted. Travel on the X axis is measured from the point of symmetry of the core with respect to the center solenoid, and may be related to travel in either direction. The force exerted upon the core by the end solenoid is plotted on the Y axis. The lower curve is the operation of the device on a six volt battery, and the upper curve is its operation on a twelve volt battery. While the curve shows the operation for only one end of the solenoid the other end will be the same in the reverse direction because both the solenoids and the core are symmetrical.

Considering operation on twelve volts, it will be observed that when power is applied and the core is in the center position an axial force of seventy-five pounds will be initially exerted. As the core is moved to the right this force will increase to one hundred and fifty pounds at a position about 2¼ inches off the center. From this point on, the force rapidly decreases to a value of about fifty pounds at a distance of 3½ inches from the center, and the curve then rises to a value of eighty pounds at a distance of 4½ inches from the center. From this second maximum the force rapidly drops to zero at a distance of five inches from the center, the core having at this point of the curve reached a position of symmetry with respect to the end solenoid.

The value of a force curve of the nature shown for the purpose intended becomes evident when considering the desirability of having a rather large force to effect an initial turning over of the propeller shaft and gears from a position of rest or from a state of rotation in the opposite direction, and then a rather rapid decrease in the force applied as the parts come up to speed and synchronism. If this were not done the parts would grab and shock would result. This rapid reduction gives a soft feathery action to the engagement, and prevents shock. However, if the parts are brought into synchronism with this slight pressure, much slippage will occur at the last and the clutch will be a long time in operating and obtaining synchronism. This slippage is prevented by increasing the pressure applied just prior to obtaining synchronism. This increased pressure is represented by the points of inflection at 3¼ inches of travel, by the presence of the minimum at 3½ inches, and the rising pressure curve up to 4½ inches where it again rapidly drops off. It is even possible to get varying desirable results without the second maximum on the curve. These results may be obtained by simply adding a point of inflection where the curvature changes from negative to positive and the pressure is maintained at a more or less constant value until engagement is complete.

As hereinbefore set forth, the degree of change in the curvature of the force travel curve may be regulated by the contour of the core. The change from the large cross-sectional area to the small one may be made abruptly or gradually and the small cross sectional area may be maintained for only a short distance or for a longer distance depending upon the operational characteristics desired. No effort is made herein to particularize insofar as the manner of modifying the shape of the end prolongations to accomplish any given thrust curve is concerned. This is deemed to be properly the province of a method application, and will be described and claimed in an application for Letters Patent of the United States which is now under preparation and will be filed in due course as a continuation-in-part hereof.

Having thus described my invention, I claim:

1. In the art of solenoid-and-plunger electromagnets, in combination: a cylindrical exciting coil having, at each end thereof, high-permeance polar rings of quite extended and relatively uniform width throughout the diametrical extent of each ring; and a plunger core therefor providing a center part steeply cut away at the ends to describe shoulders which are of sharp definition at their originating point of juncture with the perimeter of the center part, and having terminal elements projecting as integrate and axial prolongations of the center part from the inner limits of the shoulders, said originating shoulder-junctures being spaced in substantial correspondence with the spacing which obtains between the median line of one and the median line of the other of the two polar rings.

2. Structure according to claim 1 in which said prolongations of the center part are given an expanded compass at their outer ends to present terminal heads arranged and adapted to closely fit the coil and which said heads are separated from the said originating shoulder-junctures by air gaps of pronounced width.

3. In the art of solenoid-and-plunger electromagnets, in combination: a cylindrical exciting coil having high-permeance polar rings at each end thereof, and providing a high-permeance sleeve encasing the coil and in contiguity with the two polar rings; and a plunger core therefor closely fitting the coil and describing circumscribing shoulders at the two ends which are of sharp definition at their originating point of juncture with the perimeter of the plunger, said originating shoulder-junctures being spaced apart a distance substantially corresponding to the spacing which obtains between the median line of one and the median line of the other of the two polar rings, and said core throughout its length between one and the other said shoulder-juncture having a uniform diameter closely fitting the coil.

4. In the art of solenoid-and-plunger electromagnets, in combination: a pair of functionally identical and co-axial exciting coils arranged to be independently energized and provided at respective outer and inner ends with high-permeance polar rings of which the inner said ring is common to both coils; and a close-fitting plunger core common to the two coils providing a center part steeply cut away at the ends to describe shoulders which are of sharp definition at their originating point of juncture with the perimeter of the center part, and having terminal elements projecting as integrate and axial prolongations of the center part from the inner limits of the two shoulders, said armature core being of a balanced contour establishing correspondence, considered in terms of inherent reluctance, as between any two points within its length spaced equidistantly from opposite sides of the transverse median, and said originating shoulder-junctures being spaced in substantial correspondence with the spacing which obtains between the median line of the inner and the median line of an outer said polar ring.

5. Structure according to claim 4 in which said prolongations of the center part are given an expanded compass at their respective outer end to present terminal heads of a diameter corresponding to the diameter of the center part and which occupy positions relatively distant from a related end limit of the center part to present an air gap of pronounced width therebetween, the degree of prolongation being such that a centering of the armature core within one said coil causes the terminal head which lies proximal to the other coil to project well into and receive a strong force of initial attraction by an excitation of the latter said coil.

6. In the art of solenoid-and-plunger electromagnets, in combination: a series of functionally identical and co-axial exciting coils arranged to be independently energized, having high-permeance polar rings at the inner and the outer ends of each coil of which the inner said ring is common to two adjacent coils, and providing a high-permeance sleeve encasing the coils and in contiguity with the several polar rings; and a close-fitting plunger core for the coils providing a center part steeply cut away at the ends to describe circumscribing shoulders which are of sharp definition at their originating point of juncture with the perimeter of the center part, and having terminal elements projecting as integrate and axial prolongations of the center part from the inner limits of the two shoulders, said armature core being of a balanced contour establishing correspondence, considered in terms of inherent reluctance, as between any two points within its length spaced equidistantly from opposite sides of the transverse median, and said originating shoulder-junctures being spaced in substantial correspondence with the spacing which obtains between the median line of the inner and the median line of the outer polar ring of a respective said coil.

GEORGE G. NAUD.